US011903467B1

(12) United States Patent
Hynecek (10) Patent No.: US 11,903,467 B1
(45) Date of Patent: Feb. 20, 2024

(54) MOBILE DEVICE CASE AND MOUNT WITH MAGNETIC LOCK

(71) Applicant: Speculative Product Design, LLC, San Mateo, CA (US)

(72) Inventor: Bryan Hynecek, Redwood City, CA (US)

(73) Assignee: Speculative Product Design, LLC, San Mateo, CA (US)

(*) Notice: Subject to any disclaimer, the term of this patent is extended or adjusted under 35 U.S.C. 154(b) by 28 days.

(21) Appl. No.: 17/890,768

(22) Filed: Aug. 18, 2022

(51) Int. Cl.
*H04M 1/02* (2006.01)
*A45C 11/00* (2006.01)
*A45C 13/10* (2006.01)
*B60R 11/02* (2006.01)
*B60R 11/00* (2006.01)

(52) U.S. Cl.
CPC .......... *A45C 11/00* (2013.01); *A45C 13/1069* (2013.01); *A45C 2011/002* (2013.01); *A45C 2011/003* (2013.01); *A45C 2200/15* (2013.01); *B60R 11/0241* (2013.01); *B60R 2011/007* (2013.01)

(58) Field of Classification Search
CPC ................ A45C 11/00; A45C 13/1069; A45C 2011/002; A45C 2011/003; A45C 2200/15; B60R 11/0241; B60R 2011/007
See application file for complete search history.

(56) References Cited

U.S. PATENT DOCUMENTS

| | | | |
|---|---|---|---|
| 10,836,325 B1* | 11/2020 | Seko | B60R 11/0241 |
| 11,242,012 B1* | 2/2022 | Bell | B60R 11/0241 |
| 2015/0172431 A1* | 6/2015 | Huang | H04B 1/3883 |
| | | | 455/575.8 |
| 2016/0373152 A1* | 12/2016 | Schmidt | A45C 11/00 |
| 2022/0029654 A1* | 1/2022 | King | A45C 13/005 |
| 2022/0203905 A1* | 6/2022 | Kazempour | B60R 11/0241 |
| 2023/0263291 A1* | 8/2023 | Macdonald | A45F 5/02 |
| | | | 224/183 |

* cited by examiner

*Primary Examiner* — Amy J. Sterling
(74) *Attorney, Agent, or Firm* — HILL, KERTSCHER & WHARTON, LLP; Gregory T. Ourada (57) ABSTRACT

Disclosed herein is a mount featuring one or more sets of embedded magnets which are designed to engage with complimentary sets of magnets disposed either in a protective case for use with the mount, or in a mobile device contained within such a protective case. The mount includes a pin which is magnetically actuated to extend into a hole disposed in the protective case when the case and the mount are brought within a prescribed distance. Thus, the case and the mount "snap together" and are restrained from sliding relative to one another by the pin.

13 Claims, 7 Drawing Sheets

MOBILE DEVICE CASE AND MOUNT WITH MAGNETIC LOCK

BACKGROUND

Magnets have been used as attachment mechanisms for hundreds of years. More recently, mobile device manufacturers and accessory manufacturers have employed magnets as an unobtrusive means of fastening mobile devices securely to chargers, stands, docks, mounts, and other objects. Magnets are excellent for such purposes because the fastening force is generated invisibly through magnetic fields. One popular system of magnetic fastening systems is MagSafe™ which was developed by Apple, Inc., as described in U.S. Pat. No. 7,311,526. Smartphones employing MagSafe technology feature an internal array of magnets that facilitate the magnetic attachment of MagSafe compatible accessories such as chargers. While early MagSafe applications involved magnetic attachment of charging cables, the technology has expanded beyond this particular application, and is now used for attachment of a variety of accessories. The use of magnetic attachment technology facilitates not only technical, but also aesthetic design considerations. One issue with such magnetically-attached accessories is that they do not resist shearing forces very well, i.e. forces that tend to make the accessory slide parallel to the surface of the device to which it is attached. In fact, all of the resistance to an applied shear force (i.e. one acting perpendicularly to magnetic lines of force) is provided by frictional forces. The frictional force that resists shearing force is directly proportional to the magnetic force holding the device and the accessory together, as well as the coefficient of friction between the surfaces in contact. This magnetic force is limited by the requirement that the devices be separated without using undue force. Thus, the frictional force resisting shear force is limited by the necessity of limiting the magnetic force.

SUMMARY

It is desirable, therefore, to have a magnetic attachment mechanism that is resistant to shear force. The embodiments described herein involve a magnetically-influenced retractable protrusion located on a first device that is extended by magnetic force so that it locks into a corresponding cavity located on a second device. It is usually desirable for the retractable protrusion to be biased into the retracted position, so that it doesn't interfere with operation of the first device. In these embodiments, any mechanism which provides such mechanical bias such as a spring may be used. One preferred embodiment features a protective case for a mobile device such as a smartphone or tablet computer which incorporates a hole. An accessory, such as an inductive charger, mounting stand, or wallet, incorporates a retractable pin. The retractable pin is flush with the surface of the device that is designed to contact the protective case until the accessory is brought within a certain distance of the hole. At this point, magnetic forces which originate in either the magnetic fastening system incorporated into the device protected by the case or located in the case itself (preferably in the vicinity of the hole), cause the retractable pin to extend, so that the pin fits into the hole. In this manner, the magnetic locking force is complemented by the resistance to shear force provided by the retractable pin.

The features of the above-described embodiments are not exclusive to each other, and any one of the features and embodiments can be combined with one or more of the other features and embodiments to arrive at further aspects of the invention.

DETAILED DESCRIPTION OF EMBODIMENTS

The invention is described in preferred embodiments in the following description with reference to the Figures, in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It is noted that, as used in this description, the singular forms "a", "an", and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well-known in the art, and because they do not facilitate a better understanding of the present invention, a discussion of such elements is not provided herein.

As used herein, "mobile device" refers to a mobile phone device, and electronic tablet device, a laptop computer, or other mobile computing system and the like.

Figure 1:
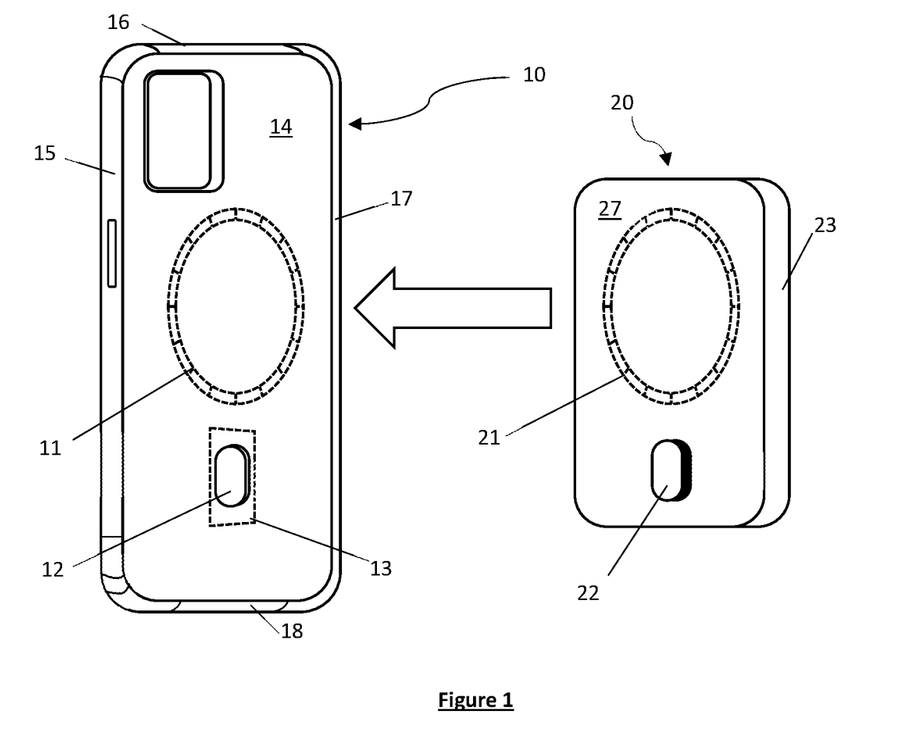
FIG. 1 is a perspective illustration of one embodiment of the claimed invention.
Figure 2:
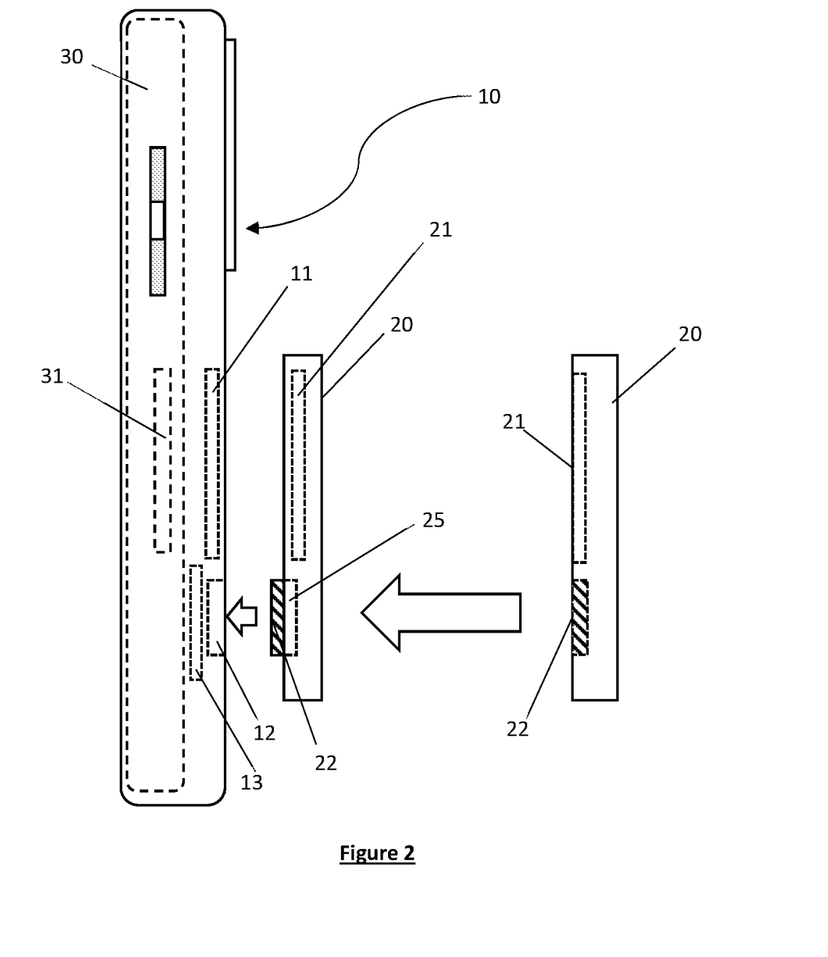
FIG. 2 is an elevation side view of the internal structure of the case and mount according to one embodiment of the claimed invention.

FIG. 1 illustrates one embodiment of an apparatus featuring a case 10 and mount 20 which are envisioned for use with mobile devices featuring magnetic attachment technology. Mobile device 30 in this embodiment shown in FIG. 2 employs a magnetic attachment means comprising a first magnetic array 31. Case 10 is constructed with a back wall 14, side walls 15 and 17, top wall 16, and bottom wall 18. The aforementioned structures define a cavity which is shaped to accommodate mobile device 30 as well as provide protection from impact and damage from contact (e.g. abrasion, scratches, etc.). FIG. 2 illustrates the mobile device 30 enclosed by the cavity of case 10. Back wall 14 incorporates a second magnetic array 11 having a defined polar orientation (e.g. N-S) such that a magnetic attractive force is generated between it and the first magnetic array 31 incorporated in mobile device 30.

Figure 3:
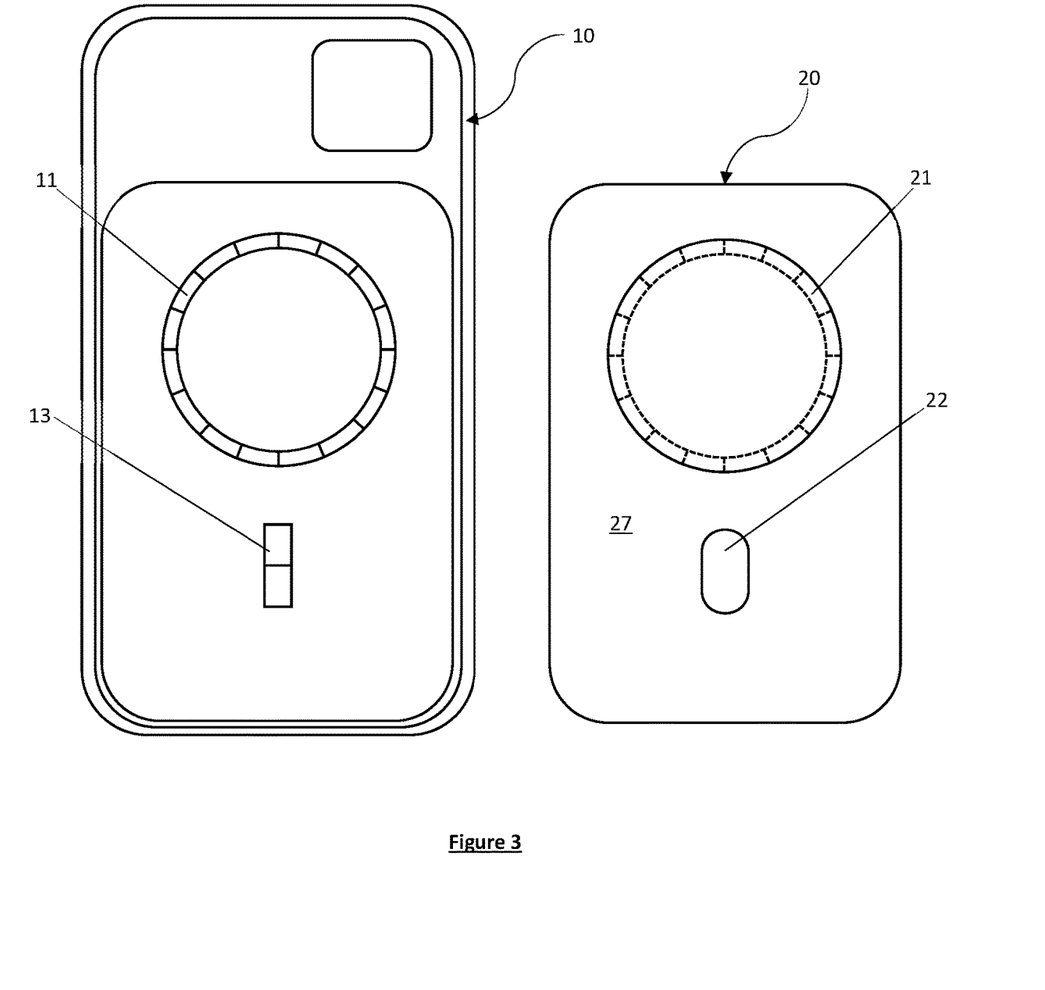
FIG. 3 is an elevation front view of the internal structure of the case and mount according to one embodiment of the claimed invention.

Magnets always have two poles, north (N) and south (S), which define the magnetic orientation of the magnet, i.e. N-S or S-N. A mobile device incorporating magnetic attachment technology will have a first magnetic array 31 of one or more magnets disposed incorporated into the mobile device. This magnetic array will have a defined polar orientation, meaning that the poles of the magnets comprising the set will be oriented N-S or S-N. Magnetic lines of force run from N-S, with the consequence that opposite poles of magnets (i.e. N and S, or S and N) generate maximum attractive forces, while like poles of magnets (i.e. N and N, or S and S) generate maximum repulsive magnetic forces. Magnetic attachment technologies will use magnetic arrays which are oriented so that opposite magnetic poles are brought into proximity with one another, as illustrated by FIG. 3 of U.S. Pat. No. 7,311,526 (referenced in Background above), where magnetic elements 130, 170 are aligned so that the magnetic element on the plug is of opposite polarity with that on the socket.

Reference to "magnets" herein can refer to permanent magnets, temporary magnets, or electromagnets. Permanent magnets are comprised of a material (e.g. neodymium) which emit a magnetic field without requiring an external source of magnetism or electricity. Temporary magnets are made of iron or iron alloys (i.e. ferrous alloys). These materials exhibit magnet-like properties while in proximity to a magnetic field emitter such as a permanent magnet or electromagnet. Finally, electromagnets are comprised of materials exhibiting magnetic properties while conducting an electrical current. In the embodiments shown, either permanent or temporary magnets having a thickness of 0.5-1.0 mm will typically be used. The strength of the magnets' magnetic field B (typically expressed in gauss or tesla) is tailored to ensure that mount 20 will attach firmly to case 10 without being too difficult for the average user to separate.

Returning to FIG. 1, case 10 further features hole 12 in the exterior of back wall 14. Hole 12 can be in any desired shape (e.g. round, oval, polygonal). In the embodiment shown, there is a third magnetic array 13 disposed behind the hole, e.g. embedded in the back wall 14 of case 10. Mount 20 features a fourth magnetic array 21 disposed within (e.g. embedded) in mount body 23. Mount body 23 incorporates a pin 22 which is shaped to fit in hole 12.

Figure 4A:
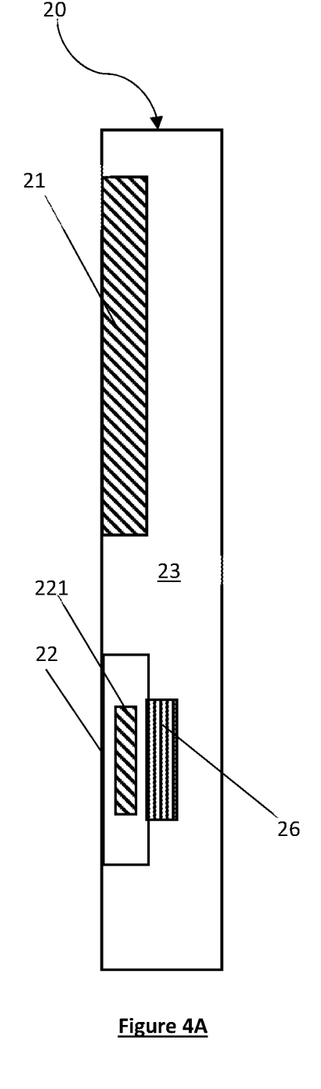
FIGS. 4A and 4B are elevation side views of the internal structure of the mount according to one embodiment of the claimed invention.
Figure 4B:
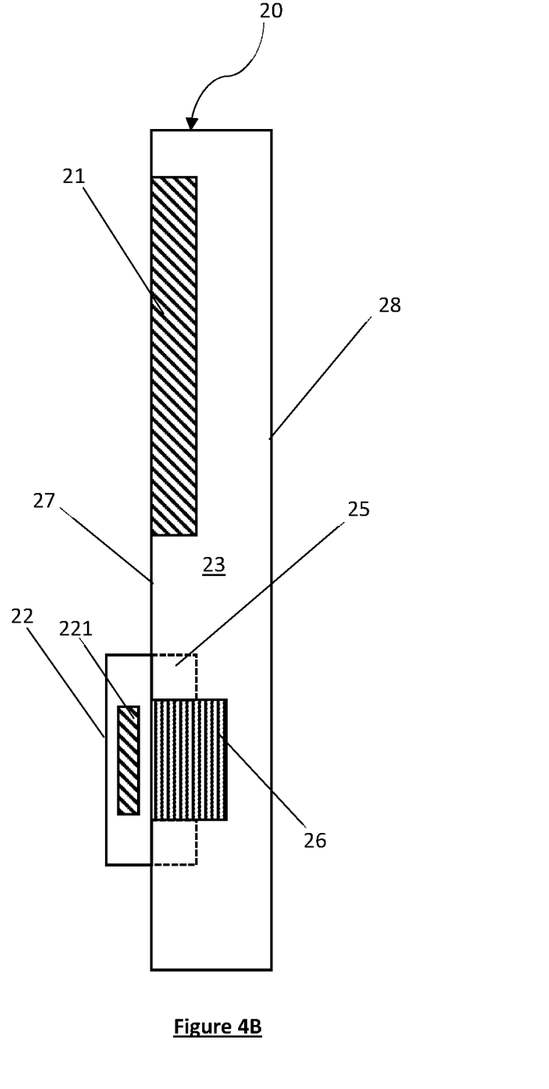

In other contemplated embodiment, pin 22 is disposed in a recess 25 as shown in FIGS. 2 and 4B. Pin 22 is attached to mount body 23 by a coiled spring or similar mechanism or material having springlike properties, i.e. where applied force varies with displacement. "Spring" can include, e.g. elastic materials (e.g. rubber), coiled springs, etc. 26 incorporated into or attached to the base of the recess 25 in which pin 22 is disposed. Pin 22 has an upper surface and a shaft and incorporates a fifth magnetic array 221. When pin 22 is located in recess 25, the upper surface of pin 22 is flush with the front side 27 of mount body 23 when pin 22 is in a retracted position. The fact that the upper surface of pin 22 is flush with the front side of mount by 23 when the pin is retracted gives the mount greater compatibility with cases for mobile devices featuring a magnetic array, but which do not have the hole featured in the embodiments herein. In certain contemplated embodiments, the pin is restricted to linear motion and is extended by magnetic force and retracted by gravity. In certain embodiments, pin 22 may protrude permanently from the front side 27 of mount body 23, although this limits the mount's ability to be used with cases which don't feature a hole. In yet another contemplated embodiment, hole 12 could be located in mount 20, and pin 22, and recess 25 may be disposed in the back wall 14 of case 10.

FIG. 2 illustrates the internal structure of case 10 and mount 20. FIG. 2 illustrates that as mount 20 is brought into proximity to case 10 magnetic force is generated both between a second magnetic array 11 and a fourth magnetic array 21 which will "snap" case 10 and mount 20 together. Simultaneously, as pin 22 comes into proximity with hole 12, magnetic forces generated through interaction between the third magnetic array 13 and pin 22 will cause it to extend toward the hole 12 against the restraining force of spring 26. This is illustrated in FIGS. 4A and 4B. Generally, the word "proximity" pertaining to magnets herein refers to a distance where a generated magnetic force causes an acceleration in a referenced component relative to an available degree of freedom.

An alternate embodiment omits spring 26 in lieu of a sixth magnetic array 29 disposed at the bottom of recess 25. The strength of the magnet(s) comprising sixth magnetic array 29 is precisely selected so that pin 22 is restrained until a precise distance between case 10 and mount 20 is reached, at which point the magnetic force generated between the third magnetic array 13 and fifth magnetic array 221 incorporated into pin 22 overcomes that between the fifth and sixth magnetic arrays, and the pin 22 would quickly translate outward to engage hole 12. Alternate embodiments featuring a combination of spring 26 and magnets array 29 in the recess 25 are also contemplated.

Figure 5A:
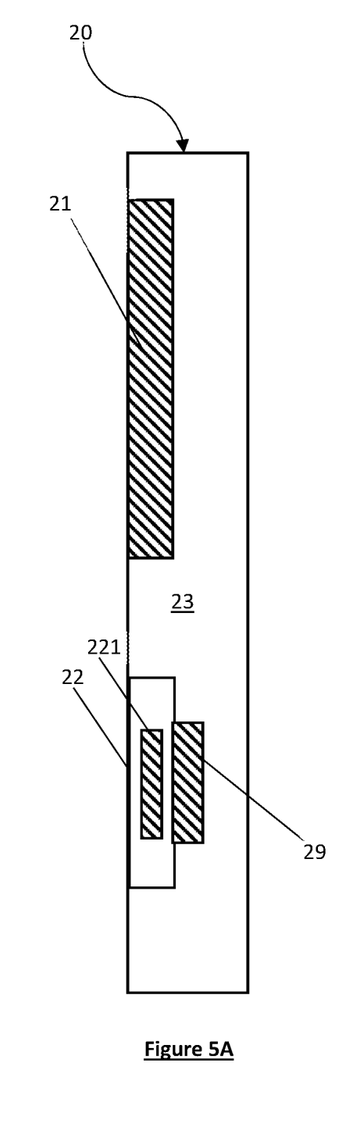
FIGS. 5A and 5B are elevation side views of the internal structure of the mount according to an alternate embodiment of the claimed invention.
Figure 5B:
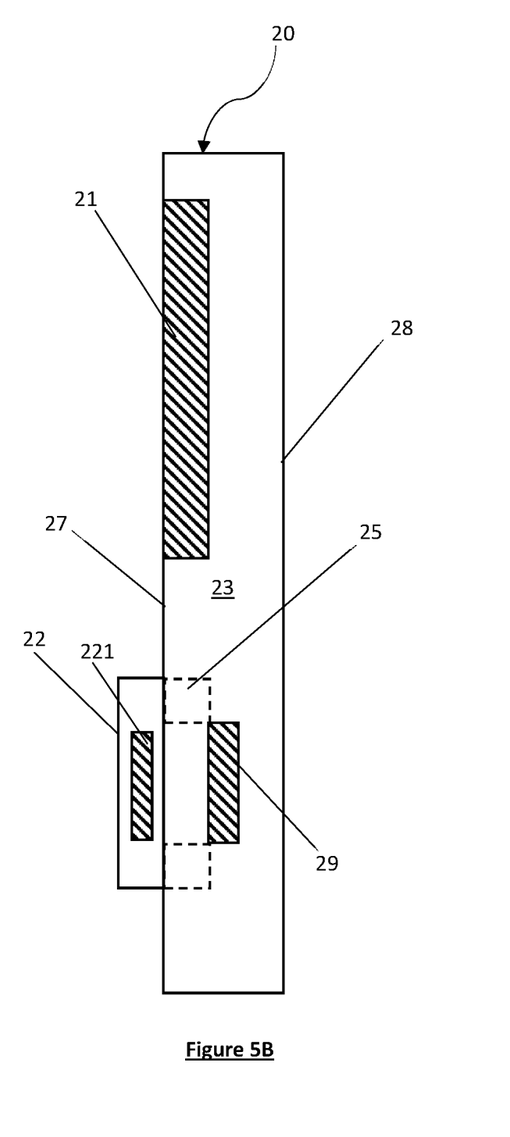

In another embodiment, case 10 omits the second magnetic array 11 and fourth magnetic array 13, relying instead on the first magnetic array 31 residing in the mobile device. Mount 20 in this embodiment would still feature magnetic arrays 21 and 221. See FIG. 5B. Yet another embodiment may omit magnets 21, and simply rely on magnets 22. In this embodiment, the pin and recess may be disposed opposite the first set of magnets 31, and hole 12 may be disposed in case 10 directly opposite the first set of magnets 31.

The embodiments illustrated herein may be employed for a wide variety of applications. One application would feature mount 20 as part of an apparatus used to mount a mobile device 30 in a vehicle. Another application would incorporate mount 20 into a wallet that snaps onto case 10. Mount 20 could also be incorporated into a tripod for a camera incorporated into mobile device 30. Mount 20 may be part of a flashlight that snaps onto the back of case 10. Mount 20 may also form part of a removable portable battery or a handle, camera monopod, etc. With the above in mind, while the structure of the front side 27 of mount 20 is as described herein, the back side 28 of mount 20 will vary widely depending upon the particular application that the mount is a part of.

Figure 6:
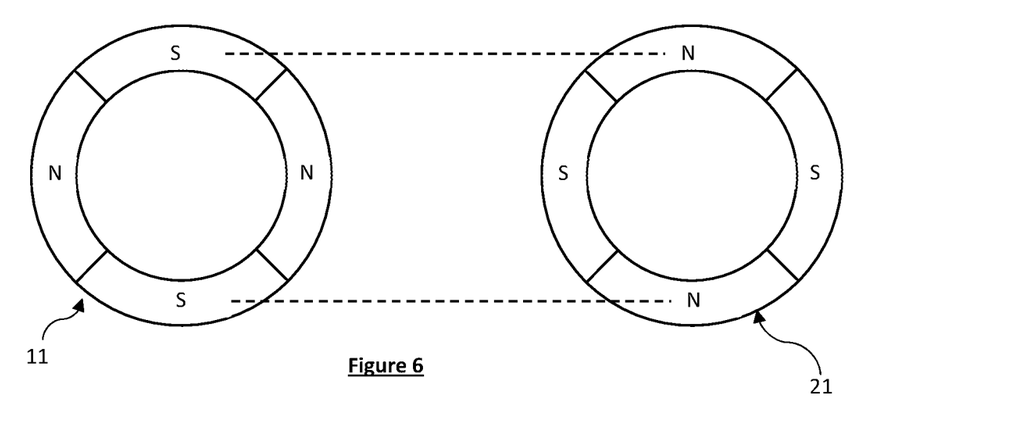
FIG. 6 illustrates a configuration for a self-aligning magnetic array that may be incorporated into one or more embodiments.

Magnetic arrays 11 and 21 of case 10 and mount 20 respectively may be constructed in such a way that these magnetic arrays are self-aligning. This is desirable in order to ensure that pin 22 is properly aligned with hole 12, taking advantage of the fact that north poles (N) and south poles (S) attract. One such arrangement is illustrated in FIG. 6 where an improper alignment will tend to cause a repulsive force generated by like poles. For the configuration shown in FIG. 6, with four magnets, a misalignment of up to 45 degrees can be corrected. Using six magnets, the alignment can be off by approximately 30 degrees, and so on according to the formula $M=360/2n$ where M is the maximum angular misalignment and n is an even positive number of magnets disposed in the circular configuration illustrated in FIG. 6.

Figure 7:
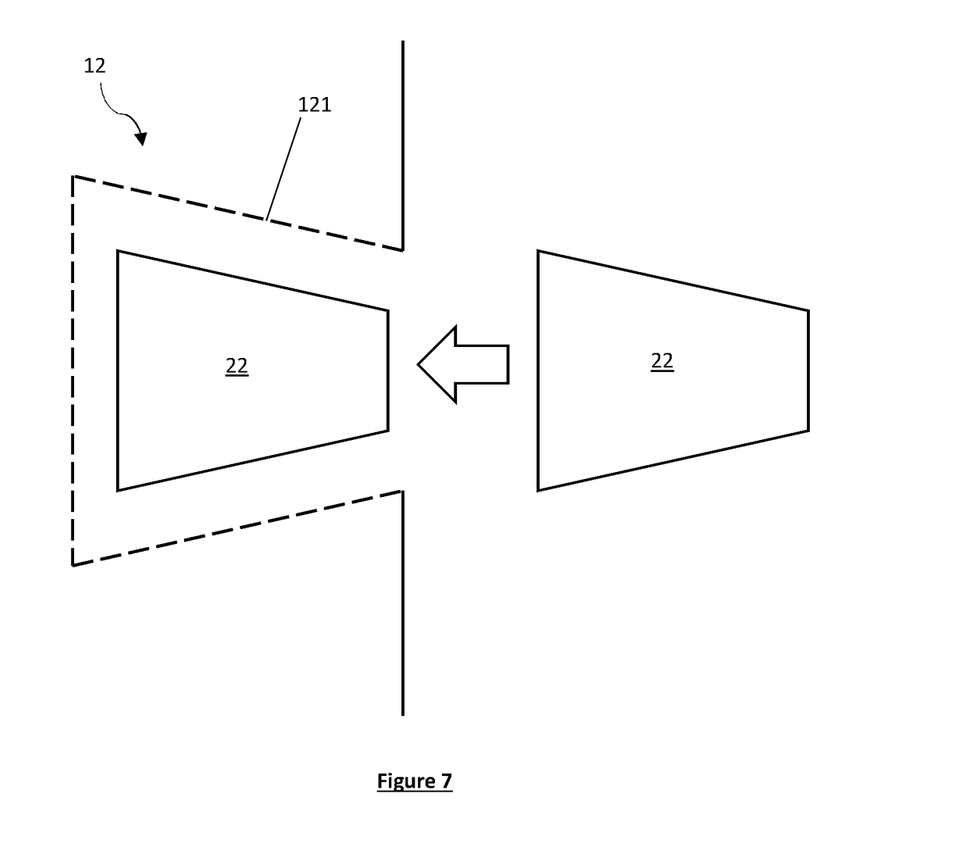
FIG. 7 is an illustration of an internally-biased hole and pin configuration according to one embodiment.

FIG. 7 illustrates an embodiment of hole 12 that facilitates engagement of the pin 22 into hole 12. Although the foregoing embodiments have featured a hole 12 having walls that typically descend perpendicularly from the opening of the hole, certain embodiments of hole 12 feature inwardly-biased walls 121 (the angles shown in FIG. 7 are exaggerated somewhat for clarity). In such embodiments, the upper surface and/or shaft of pin 22 is outwardly-flared (e.g. shaped trapezoidally) to engage the inwardly-biased walls as illustrated in FIG. 7. Such a configuration enhances the engagement between pin 22 and hole 12, further resisting any shearing forces by further reducing the tendency of pin 22 to slide out of hole 12.

Figure 8:
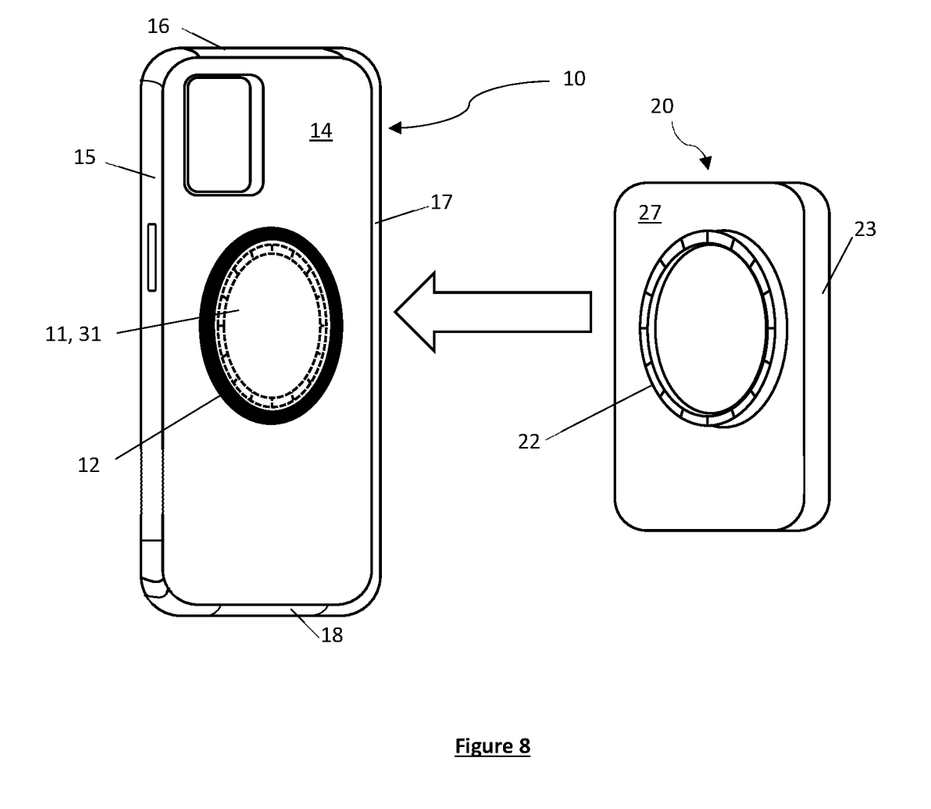
FIG. 8 illustrates an alternate configuration of the case and mount according to one embodiment.

An alternative embodiment of that illustrated in FIG. 1 is shown in FIG. 8. In this embodiment, the functions of the magnetic attachment arrays 11 or 31 located in the case or the mobile device, respectively, and magnetic array 21 in the mount are combined with that of the pin 22 and hole 12. That is, the magnetic attachment arrays and the pin and hole are combined into a single structure. This embodiment features a hole 12, located above the magnetic arrays 11 or 31. Pin 22 is disposed so that when mount 20 is opposite hole 12, pin 22 (which in the embodiment shown is ring-shaped) will extend from recess 25 into hole 12. In the embodiment shown, the magnetic arrays 11, 21, and 31 are circular, so hole 12 will be ring shaped, with magnetic arrays 11 and 31 disposed in proximity to hole 12 so that the magnetic field is strong enough to cause pin 22 to extend into hole 12. In other variations of this particular embodiment, hole 12 and pin 22 may be shaped similarly to those shown in FIGS. 1-5.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. It is noted that the terminology used above is for the purpose of reference only, and is not intended to be limiting. For example, terms such as "upper," "lower," "above," "below," "rightward," "leftward," "clockwise," and "counterclockwise" refer to directions in the drawings to which reference is made. As another example, terms such as "inward" and "outward" may refer to directions toward and away from, respectively, the geometric center of the component described. As a further example, terms such as "front," "rear," "side," "left side," "right side," "top," "bottom," "inner," "outer," "horizontal," and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Indeed, the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally. Moreover, the disclosure set forth herein includes the mirror image, i.e., mirror configuration, taken from any perspective of any drawing or other configuration shown or described herein. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

What is claimed is:

1. An apparatus for use with a mobile device comprising a first magnetic array, the apparatus comprising:
  a protective case adapted to enclose the mobile device, comprising:
    a cavity adapted to receive the mobile device defined by an upper wall, lower wall, left wall, right wall, and a back wall, wherein the back wall comprises:
      an interior side facing the cavity;
      an exterior side;
      a second magnetic array, wherein the second set is arranged such that the second magnetic array magnetically attracts the first magnetic array when the mobile device is disposed in the cavity;
      a third magnetic array; and
      a hole comprising:
        an opening in the exterior side having a defined shape;
        a bottom disposed between the interior side and the exterior side; and
        one or more hole walls extending between the opening and the bottom;
      wherein the third magnetic array is disposed in proximity to the hole; and
  a mount adapted to magnetically attach to the exterior side of the protective case comprising:
    a mount body comprising a front surface;
    a fourth magnetic array;
    a pin comprising:
      an upper surface having the defined shape, and
      a shaft;
      a fifth magnetic array;
      wherein the pin is adapted to translate from a first position to a second position under the influence of a magnetic force generated when the pin is proximate to the third magnetic array, wherein the pin is positioned relative to the fourth magnetic array such that the pin is disposed generally opposite the hole when the fourth magnetic array is aligned opposite and in register with the second magnetic array;

wherein the first position is characterized by the upper surface flush with the first surface and the shaft being surrounded by the mount body; wherein the second position is characterized by the upper surface located proximate the bottom of the hole.

2. The apparatus of claim 1, wherein the fifth magnetic array comprises a permanent magnet.

3. The apparatus of claim 1, wherein the pin is outwardly-flared and the one or more hole walls are inwardly-biased.

4. The apparatus of claim 1, wherein the second and fourth magnetic arrays are self-aligning.

5. An apparatus for use with a mobile device incorporating a first magnetic array, the apparatus comprising:
a protective case comprising:
a cavity defined by a left wall, right wall, top wall, bottom wall, and a back wall, wherein the back wall comprises:
an interior side; and
an exterior side;
wherein the cavity is adapted to receive the mobile device, and wherein the back wall comprises a second magnetic array;
a hole disposed in the exterior side, the hole comprising: a bottom, and a third magnetic array;
a mount comprising:
a front surface;
a fourth magnetic array;
a recess comprising pin restraining means;
a pin comprising:
a fifth magnetic array;
a shaft; and
an upper surface;
wherein the pin is adapted to translate from a first position from a second position, wherein the first position is characterized by the upper surface being flush with the front surface and the shaft being contained within the recess, and the second position is characterized by the upper surface and a portion of the shaft disposed within the hole.

6. The apparatus of claim 5, wherein the pin restraining means comprises a sixth magnetic array.

7. The apparatus of claim 5, wherein the pin restraining means comprises a spring.

8. The apparatus of claim 5, wherein the second and fourth magnetic arrays are self-aligning.

9. The apparatus of claim 5, wherein the hole further comprises one or more inwardly-biased walls.

10. An apparatus used for attaching a mobile device comprising magnetic attachment means to an object, the apparatus comprising:
a first mounting body comprising:
a front side comprising a recess containing a pin adapted to translate from a first position to a second position when the pin is subject to a magnetic force generated by the magnetic attachment means;
a second side adapted to be attached to the object;
a case adapted to enclose the mobile device, the case comprising: a hole disposed in proximity to the magnetic attachment means;
wherein the first position is characterized by the pin being contained within the recess, and the second position is characterized by a substantial portion of the pin being extended into the hole.

11. The apparatus of claim 10, wherein the case further comprises a top wall, bottom wall, left wall, right wall, and back wall which define a cavity, wherein the back wall comprises a third magnetic array and an exterior surface, wherein the hole is disposed in the exterior surface.

12. The apparatus of claim 10, wherein the pin is comprised of an upper surface and a shaft.

13. The apparatus of claim 12, wherein in the first position, the upper surface of the pin is flush with the front side.

* * * * *

UNITED STATES PATENT AND TRADEMARK OFFICE
CERTIFICATE OF CORRECTION

| | |
|---|---|
| PATENT NO. | : 11,903,467 B1 |
| APPLICATION NO. | : 17/890768 |
| DATED | : February 20, 2024 |
| INVENTOR(S) | : Bryan Hynecek |

It is certified that error appears in the above-identified patent and that said Letters Patent is hereby corrected as shown below:

In the Claims

Column 6, Line 40 the phrase "the second set" should read --the second magnetic array--.

Signed and Sealed this
Nineteenth Day of March, 2024

Katherine Kelly Vidal
*Director of the United States Patent and Trademark Office*